United States Patent
Ando et al.

(10) Patent No.: US 9,511,682 B2
(45) Date of Patent: Dec. 6, 2016

(54) VEHICLE, AND VEHICLE CONTROL METHOD

(71) Applicant: HONDA MOTOR CO., LTD., Tokyo (JP)

(72) Inventors: Yoshinori Ando, Sakura (JP); Toshinori Tsukamoto, Utsunomiya (JP); Masatoshi Noguchi, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/902,061

(22) PCT Filed: Dec. 25, 2014

(86) PCT No.: PCT/JP2014/084298
§ 371 (c)(1),
(2) Date: Dec. 30, 2015

(87) PCT Pub. No.: WO2015/099032
PCT Pub. Date: Jul. 2, 2015

(65) Prior Publication Data
US 2016/0144739 A1   May 26, 2016

(30) Foreign Application Priority Data
Dec. 27, 2013   (JP) ................. 2013-272723

(51) Int. Cl.
*B60K 6/00* (2006.01)
*B60L 15/20* (2006.01)
(Continued)

(52) U.S. Cl.
CPC ............ *B60L 15/2036* (2013.01); *B60K 1/02* (2013.01); *B60K 6/46* (2013.01); *B60K 6/52* (2013.01);
(Continued)

(58) Field of Classification Search
CPC .......... B60K 1/02; B60K 6/52; B60W 10/06
USPC ................... 701/22; 180/242, 243
See application file for complete search history.

(56) References Cited

U.S. PATENT DOCUMENTS 5,453,930 A * 9/1995 Imaseki ................. B60L 15/20
                                                                 180/65.265
6,024,182 A * 2/2000 Hamada ................. B60K 1/00
                                                                 180/243

(Continued)

FOREIGN PATENT DOCUMENTS

JP   2005-73457 A    3/2005
JP   2005-160262 A   6/2005

(Continued)

OTHER PUBLICATIONS

International Search Report dated Mar. 31, 2015, issued in counterpart Application No. PCT/JP2014/084298 (2 pages).

*Primary Examiner* — Thomas G Black
*Assistant Examiner* — Wae Louie
(74) *Attorney, Agent, or Firm* — Westerman, Hattori, Daniels & Adrian, LLP

(57) ABSTRACT

According to this vehicle and control method for the same, an electric motor control device sets a target left power and a target right power, on the basis of the power suppliable by a power supply, power loss dependent on the respective rotation state quantities of a left electric motor and a right electric motor, the target power difference between the left electric motor and the right electric motor, and the target sum of power of the left electric motor and the right electric motor, and controls the left electric motor and the right electric motor using the target left power and the target right power.

5 Claims, 9 Drawing Sheets

(51) Int. Cl.
*B60K 6/46* (2007.10)
*B60K 6/52* (2007.10)
*B60W 10/08* (2006.01)
*B60W 20/00* (2016.01)
*B60K 7/00* (2006.01)
*B60W 30/045* (2012.01)
*B60W 30/18* (2012.01)
*B60K 17/356* (2006.01)
*B60K 1/02* (2006.01)
*B60K 5/04* (2006.01)
*B60K 5/00* (2006.01)

(52) U.S. Cl.
CPC ........... *B60K 7/0007* (2013.01); *B60K 17/356* (2013.01); *B60L 15/20* (2013.01); *B60W 10/08* (2013.01); *B60W 20/00* (2013.01); *B60W 30/045* (2013.01); *B60W 30/18145* (2013.01); *B60K 5/04* (2013.01); *B60K 2005/003* (2013.01); *B60W 2710/086* (2013.01); *Y02T 10/6217* (2013.01); *Y02T 10/6265* (2013.01); *Y02T 10/7258* (2013.01)

(56) References Cited

U.S. PATENT DOCUMENTS

| | | | | |
|---|---|---|---|---|
| 8,209,099 | B2* | 6/2012 | Komatsu | B60W 10/06 701/22 |
| 8,255,104 | B2* | 8/2012 | Terayama | B60W 30/188 180/242 |
| 8,521,349 | B2* | 8/2013 | Yu | B60K 7/0007 701/22 |
| 2012/0015772 | A1* | 1/2012 | Kira | B60K 6/442 475/149 |
| 2013/0261863 | A1* | 10/2013 | Noguchi | B60K 1/02 701/22 |
| 2014/0191689 | A1* | 7/2014 | Noguchi | B60K 6/52 318/3 |

FOREIGN PATENT DOCUMENTS

JP 2013-212726 A 10/2013
JP 2013-215017 A 10/2013

\* cited by examiner

VEHICLE, AND VEHICLE CONTROL METHOD

TECHNICAL FIELD

The present invention relates to a vehicle having a left electric motor mechanically connected to a left wheel and a right electric motor mechanically connected to a right wheel, and a method of controlling such a vehicle.

BACKGROUND ART

U.S. Patent Application Publication No. 2014/0191689 (hereinafter referred to as "US 2014/0191689A1") discloses a motive power control for left and right electric motor generators (electric motors) for vehicles. More specifically, according to US 2014/01689A1, there are assumed a first relationship including the sum of a left wheel torque, etc., and a right wheel torque, etc., a second relationship including the difference between the left wheel torque, etc., and the right wheel torque, etc., and a third relationship including the sum of a left electric power, which is the electric power generated or consumed by a left electric motor generator, and a right electric power, which is the electric power generated or consumed by a right electric motor generator (claim 1). An electric power priority control for controlling the left-electric motor generator and the right electric motor generator in order to satisfy the third relationship as a first priority is carried out on the basis of the third relationship and at least one of the first relationship and the second relationship (claim 1).

The electric power priority control disclosed in US 2014/0191689A1 is described in relation to a situation in which the sum of the electric power P1 of the electric motor generator (e.g., electric motor 2B) in a powering mode, and the electric power P2 of the electric motor generator (e.g., electric motor 2A) in a regenerative mode is zero (see paragraphs [0197], [0217]).

SUMMARY OF INVENTION

As described above, according to the electric power priority control disclosed in US 2014/0191689A1, the left electric motor generator and the right electric motor generator are controlled in order to satisfy the third relationship as a first priority on the basis of the third relationship and at least one of the first relationship and the second relationship (claim 1). However, the process of utilizing the first through third relationships still remains to be improved. For example, no detailed study has been made in US 2014/0131689A1 concerning utilization of the first relationship in addition to the second relationship and the third relationship.

In US 2014/0191689A1, the electric power priority control is described in relation to a situation in which the sum P1+P2 of the electric powers of the left and right electric motors is zero ([0197], [0217]). A situation in which the sum P1+P2 is not zero has yet to be studied.

The present invention has been made in view of the aforementioned problems. An object of the present invention is to provide a vehicle, which is capable of appropriately controlling the motive power of left and right electric motors, as well as to provide a method of controlling such a vehicle.

A vehicle according to the present invention comprises a left electric motor mechanically connected to a left wheel, a right electric motor mechanically connected to a right wheel, an electric motor controller, which is configured to control a left motive power that is a motive power generated by the left electric motor, and control a right motive power that is a motive power generated by the right electric motor, and an electric power source electrically connected to the left electric motor and the right electric motor. The electric motor controller is configured to determine a left and right sum upper limit value, which is a maximum value of a sum of the left motive power and the right motive power, based on the electric power that is capable of being supplied from the electric power source, determine a target left motive power for the left electric motor and a target right motive power for the right electric motor based on the left and right sum upper limit value, a target left and right difference, which is a target value for a difference between the left motive power and the right motive power, and a target left and right sum, which is a target value for a sum of the left motive power and the right motive power, determine a left loss electric power based on the target left motive power and a rotational state quantity of the left electric motor, and a right loss electric power based on the target right motive power and a rotational state quantity of the right electric motor, correct the left and right sum upper limit value based on the left loss electric power and the right loss electric power, to thereby determine a corrected left and right sum upper limit value, correct the target left motive power and the target right motive power based on the corrected left and right sum upper limit value and the target left and right difference, and control the left electric motor and the right electric motor based on the target left motive power and the target right motive power, which have been corrected.

According to the present invention, an electric power loss, which is based on the rotational state quantities of the left electric motor and the right electric motor, is reflected in each of the motive power target values for the left electric motor and the right electric motor. Therefore, it is possible to appropriately set the motive power target values for the left electric motor and the right electric motor.

According to the present invention, there also is provided a method of controlling a vehicle, wherein the vehicle includes a left electric motor mechanically connected to a left wheel, a right electric motor mechanically connected to a right wheel, an electric motor controller, which is configured to control a left motive power that is a motive power generated by the left electric motor, and control a right motive power that is a motive power generated by the right electric motor, and an electric power source electrically connected to the left electric motor and the right electric motor. In the method, the electric motor controller is configured to perform the steps of determining a left and right sum upper limit value, which is a maximum value of a sum of the left motive power and the right motive power, based on the electric power that is capable of being supplied from the electric power source, determining a target left motive power for the left electric motor and a target right motive power for the right electric motor based on the left and right sum upper limit value, a target left and right difference, which is a target value for a difference between the left motive power and the right motive power, and a target left and right sum, which is a target value for a sum of the left motive power and the right motive power, determining a left loss electric power based on the target left motive power and a rotational state quantity of the left electric motor, and a right loss electric power based on the target right motive power and a rotational state quantity of the right electric motor, correcting the left and right sum upper limit value based on the left loss electric power and the right loss electric power, to thereby determine a corrected left and right sum upper limit value, correcting the target left motive power and the target right motive power based on the corrected left and right sum upper limit value and the target left and right difference, and controlling the left electric motor and the right electric motor based on the target left motive power and the target right motive power, which have been corrected.

A vehicle according to the present invention comprises a left electric motor mechanically connected to a left wheel, a right electric motor mechanically connected to a right wheel, an electric motor controller, which is configured to control a left motive power that is a motive power generated by the left electric motor, and control a right motive power that is a motive power generated by the right electric motor, and an electric power source electrically connected to the left electric motor and the right electric motor. The electric motor controller is configured to set a target left motive power for the left electric motor and a target right motive power for the right electric motor based on the electric power that is capable of being supplied from the electric power source, an electric power loss depending on respective rotational state quantities of the left electric motor and the right electric motor, a target motive power difference between the left electric motor and the right electric motor, and a target motive power sum of the left electric motor and the right electric motor, and control the left electric motor and the right electric motor using the target left motive power and the target right motive power.

According to the present invention, the electric motor controller sets the target left motive power and the target right motive power on the basis of an electric power loss depending on respective rotational state quantities of the left electric motor and the right electric motor, in addition to the electric power that is capable of being supplied from the electric power source, a target motive power difference between the left electric motor and the right electric motor, and a requested motive power sum of the left electric motor and the right electric motor. The electric power loss, which occurs in each of the left electric motor and the right electric motor, varies depending on the rotational state quantities (e.g., rotational speed per unit time) of each of the left electric motor and the right electric motor. Therefore, by using the electric power loss depending on the rotational state quantities for setting the target left motive power and the target right motive power, it is possible to appropriately control the motive power of the left electric motor and the right electric motor.

The electric motor controller may be configured to set an upper limit value for a sum motive power of the left electric motor and the right electric motor based on the electric power that is capable of being supplied, the electric power loss depending on the rotational state quantities, and the target motive power difference, and to set the target left motive power and the target right motive power to ranges in which the target motive power sum does not exceed the upper limit for the sum motive power while the target motive power difference is maintained. Insofar as the upper limit value for the sum motive power is set on the basis of the respective rotational state quantities of the left electric motor and the right electric motor and the target motive power difference between the electric motors, in addition to the electric power that is capable of being supplied from the electric power source, the motive power of the left electric motor and the right electric motor can be controlled more appropriately.

The electric motor controller may be configured to set a reference upper limit value for the sum motive power based on the electric power that is capable of being supplied and the rotational state quantities, to calculate an electric power loss depending on the rotational state quantities based on the reference upper limit value for the sum motive power and the rotational state quantities, to set a left motive power limiting value, which is a limiting value for the target left motive power, and a right motive power limiting value, which is a limiting value for the target right motive power, based on the reference upper limit value and the target motive power difference, to calculate a correcting value for the electric power loss based on the left motive power limiting value, the right motive power limiting value, and the rotational state quantities, and to set the upper limit value for the sum motive power based on the electric power that is capable of being supplied, the electric power loss, and the correcting value.

With the above arrangement, a correcting value for the electric power loss is calculated on the basis of the left motive power limiting value, the right motive power limiting value, and the rotational state quantities. In addition, an upper limit value for the sum motive power is set on the basis of the electric power that is capable of being supplied, the electric power loss depending on the rotational state quantities, and the correcting value. The left motive power limiting value and the right motive power limiting value are based on the reference upper limit value for the sum motive power and the target motive power difference, and the reference upper limit value is based on the rotational state quantities and the electric power that is capable of being supplied. Consequently, it is possible to reflect the electric power loss depending on the left-motive power limiting value and the right motive power limiting value, in addition to the electric power loss depending on the rotational state quantities. Therefore, the motive power of the left electric motor and the right electric motor can be controlled more efficiently.

DESCRIPTION OF EMBODIMENTS

I. Embodiment
A. Arrangement
A-1. Overall Arrangement

Figure 1:
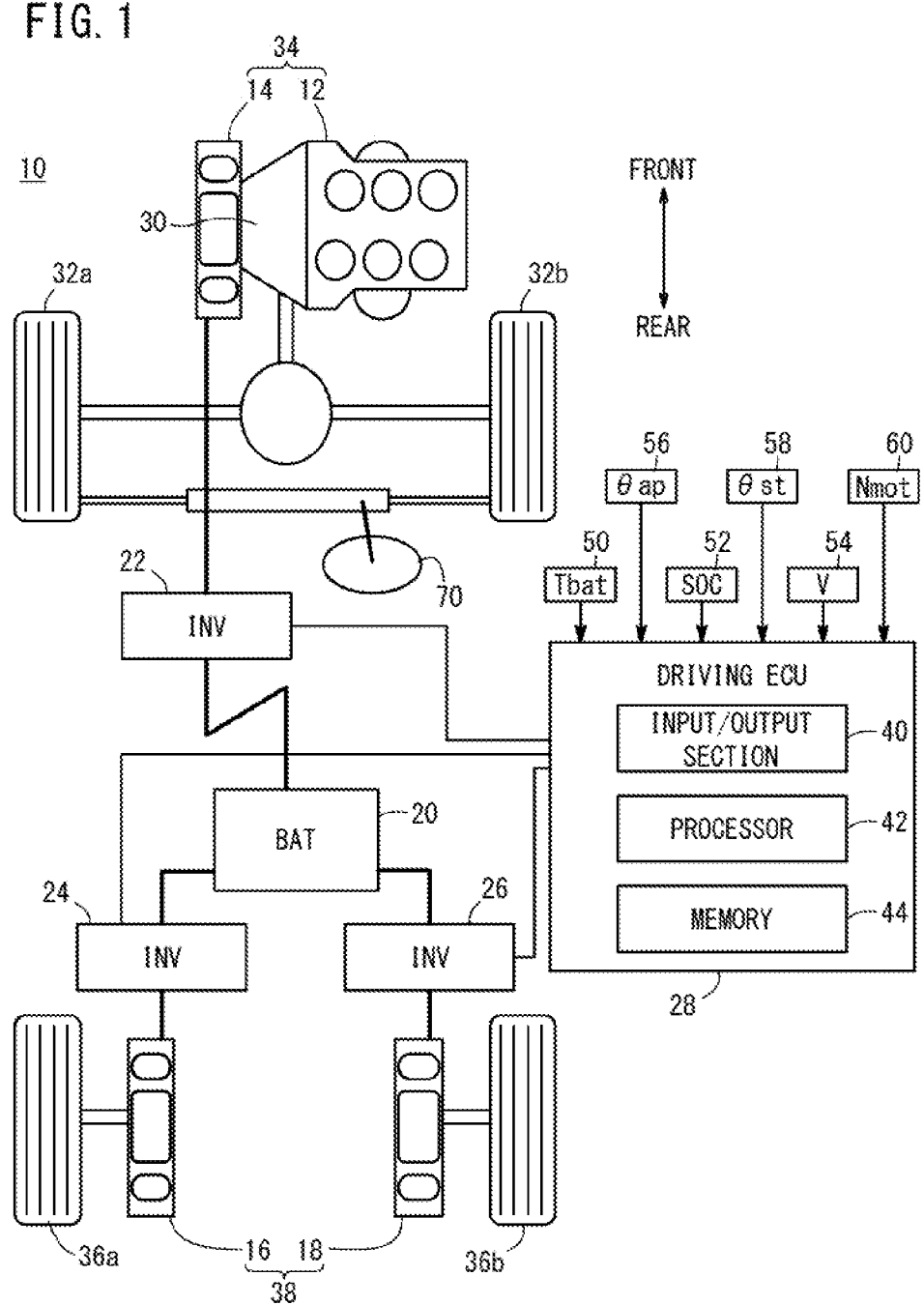
FIG. 1 is a schematic view of the drive train and the surrounding periphery of a vehicle according to an embodiment of the present invention.

FIG. 1 is a schematic view of the drive train and the surrounding periphery of a vehicle 10 according to an embodiment of the present invention. As shown in FIG. 1, the vehicle 10 has an engine 12 and a first traction motor 14, which are disposed in line on a front side of the vehicle 10, second and third traction motors 16, 18, which are disposed on a rear side of the vehicle 10, a high-voltage battery 20 (hereinafter also referred to as a "battery 20"), first through third inverters 22, 24, 26, and a driving electronic control unit 28 (hereinafter referred to as a "driving ECU 28" or an "ECU 28").

Hereinafter, the first traction motor 14 will also be referred to as a "first motor 14", a "motor 14", or a "front motor 14". The second traction motor 16 will also be referred to as a "second motor 16", a "left motor 16", a "motor 16", or a "rear motor 16". The third traction motor 18 will also be referred to as a "third motor 13", a "right motor 18", a "motor 18", or a "rear motor 18".

The engine 12 and the first motor 14 transmit driving power or braking power (hereinafter also referred to as "braking/driving power") through a transmission 30 to a left front wheel 32a and a right front wheel 32b (hereinafter referred to collectively as "front wheels 32"). The engine 12 and the first motor 14 make up a front wheel driving device 34 (steering wheel driving device).

An output shaft of the second motor 16 is connected to the rotational shaft of a left rear wheel 36a, and transmits braking/driving power to the left rear wheel 36a. An output shaft of the third motor 18 is connected to the rotational shaft of a right rear wheel 36b, and transmits braking/driving power to the right rear wheel 36b. Speed reducers, not shown, may be disposed between the second motor 16 and the left rear wheel 36a, as well as between the third motor 18 and the right rear wheel 36b. The second and third motors 16, 18 make up a rear wheel driving device 38 (non-steering wheel driving device). The left rear wheel 36a and the right rear wheel 36b will hereinafter be referred to collectively as rear wheels 36.

When the vehicle 10 travels at a low vehicle speed, for example, the vehicle 10 is driven by the second and third motors 16, 18. Mien the vehicle 10 travels at a medium vehicle speed, the vehicle 10 is driven by the engine 12 and the second and third motors 16, 18. When the vehicle 10 travels at a high vehicle speed, the vehicle 10 is driven by the engine 12 and the first motor 14. At a low vehicle speed, while the engine 12 and the transmission 30 are disconnected from each other (or connected to each other) by a clutch, not shown, the engine 12 can actuate the first motor 14 in order to cause the first motor 14 to generate electric power, and the generated electric power can be supplied to the second and third motors 16, 18 or accessories (auxiliaries), not shown, or can be used to charge the battery 20. Stated otherwise, the first motor 14 can be used as an electric generator.

The high-voltage battery 20 supplies electric power to the first through third motors 14, 16, 18, and is charged with regenerated electric power Preg from the first through third motors 14, 16, 18 through the first through third inverters 22, 24, 26.

The driving ECU 28 controls the engine 12 and the first through third inverters 22, 24, 26 on the basis of outputs from various sensors and electronic control units (hereinafter referred to as "ECUs") for thereby controlling the outputs of the engine 12 and the first through third motors 14, 16, 18. The driving ECU 28 has an input/output section 40, a processor 42, and a memory 44. Alternatively, the driving ECU 28 may comprise a plurality of combined ECUs. For example, the driving ECU 28 may comprise a plurality of ECUs corresponding respectively to the engine 12 and the first through third motors 14, 16, 18, and an ECU for managing the actuated states of the engine 12 and the first through third motors 14, 16, 18.

The various sensors for outputting signals to the driving ECU 28 include, for example, a temperature sensor 50, an SOC sensor 52, a vehicle speed sensor 54, an accelerator pedal opening sensor 56, a steering angle sensor 58, and a rotational speed sensor 60.

A-2. Arrangements and Functions of Various Parts

The engine 12 comprises a 6-cylinder engine, for example, although the engine 12 may comprise another type of engine such as a 2-cylinder engine, a 4-cylinder engine, an 8-cylinder engine, or the like. The engine 12 is not limited to at gasoline engine, but may be an engine such as a diesel engine, a compressed air engine, or the like.

The first through third motors 14, 16, 18 comprise three-phase AC brushless motors, for example, but may be other motors such as three-phase AC brush motors, single-phase AC motors, DC motors, or the like. The first through third motors 14, 16, 18 may have identical or different specifications. Variable speed reduction ratios may be provided for the non-illustrated speed reducers that may be disposed between the second motor 16 and the left rear wheel 36a, as well as between the third motor 18 and the right rear wheel 36b.

The first through third inverters 22, 24, 26, which are of a three-phase bridge structure, perform DC/AC conversion in order to convert direct currents into three-phase alternating currents and supply the three-phase alternating currents to the first through third motors 14, 16, 18, and perform AC/DC conversion in order to convert alternating currents generated by the first through third motors 14, 16, 18 in a regenerative mode into direct currents and supply the converted direct currents to the high-voltage battery 20.

The high-voltage battery 20, which is an energy storage device including a plurality of battery cells, may comprise lithium ion secondary cells, nickel hydrogen secondary cells, or capacitors, for example. According to the present embodiment, the high-voltage battery 20 comprises lithium ion secondary cells. DC/DC converters, not shown, may be provided between the first through third inverters 22, 24, 26 and the high-voltage battery 20, for stepping up or down the output voltage from the high-voltage battery 20 or the output voltages from the first through third motors 14, 16, 18.

The drive train of the vehicle 10 may be of the same structure disclosed in US 2014/0191689A1 or U.S. Patent Application Publication Mo. 2012/0015772, for example. For example, as is the case with US 2014/0191689A1, non-illustrated hydraulic pumps, solenoids, one-way clutches, and hydraulic brakes, etc., may be provided in association with the second and third motors 16, 18, and may be actuated, when necessary, by the driving ECU 28 for controlling operations of the second and third motors 16, 18 (see FIG. 11 of US 2014/0191689A1).

The temperature sensor 50 detects the temperature [° C]of the battery 20 (hereinafter referred to as a "battery temperature Tbat" or a "temperature Tbat"). The SOC sensor 52 detects the state of charge (SOC) [%] of the battery 20. The vehicle speed sensor 54 detects a vehicle speed V [km/h]. The accelerator pedal opening sensor 56 detects the opening (hereinafter referred to as an "accelerator opening θap") of a non-illustrated accelerator pedal.

The steering angle sensor 58 detects the steering angle θst [degrees] of a steering wheel 70. The rotational speed sensor 60 detects the rotational speed Nmot (hereinafter also referred to as a "rotational speed Nmot" or a "motor rotational speed Nmot") [rpm] per unit time of each of the first through third motors 14, 16, 18. The rotational speeds Nmot of the second and third motors 16, 18 will hereinafter also be referred to as "rotational speeds NmotL, NmotR" or "motor rotational speeds NmotL, NmotR".

B. Output Control for Rear Motors 16, 18

B-1. Overview

Figure 2:
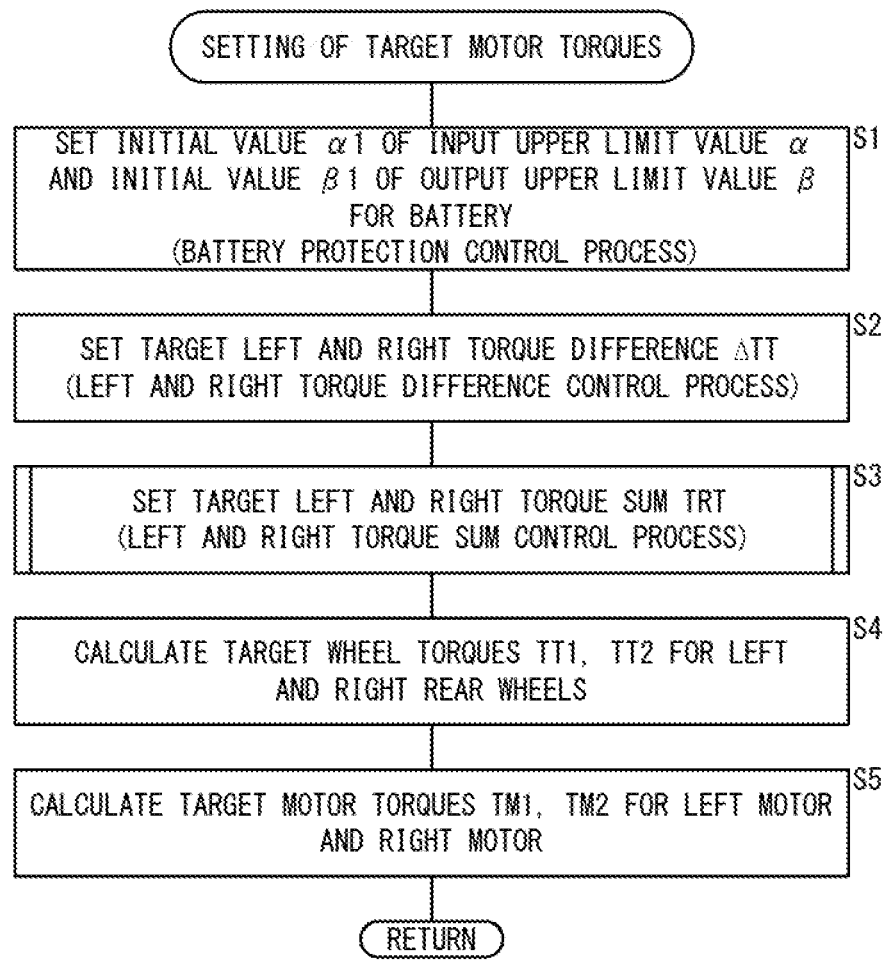
FIG. 2 is a flowchart of a process for setting target torques for rear motors according to the embodiment.

FIG. 2 is a flowchart of a process for setting target torques (hereinafter also referred to as "target motor torques TM1, TM2" or "target torques TM1, TM2") for the rear motors 16, 18 according to the present embodiment. The ECU 28 controls the motors 16, 18 on the basis of the target motor torques TM1, TM2 calculated according to the flowchart shown in FIG. 2, thereby controlling the torques of the rear wheels 36a, 36b (hereinafter also referred to as "wheel torques T1, T2" or "torques T1, T2") to reach target torques (hereinafter also referred to as "target wheel torques TT1, TT2" or "target torques TT1, TT2"). Steps S1 through S5 of FIG. 2 are repeated in predetermined periodic processing cycles.

The control process shown in FIG. 2 is carried out when the vehicle 10 is in a drive mode "RWD" (Rear Wheel Drive) and a regenerative mode ancillary to the drive mode "RWD". The drive modes according to the present embodiment include "FWD" (Front Wheel Drive) and "AWD" (All Wheel Drive) in addition to RWD. The respective drive modes are switched depending on an overall demand load, etc., on the vehicle 10. Each of RWD and FWD is a two-wheel drive mode "2WD", whereas AWD is a four-wheel drive mode "4WD".

In step S1 of FIG. 2, in a process that serves as part of a battery protection control process, the ECU 28 sets an initial value α1 [W] for an input upper limit value α of the battery 20, and an initial value β1 [W] for an output upper limit value β of the battery 20. The input upper limit value α indicates an upper limit value for the electric power that is supplied in order to charge the battery 20. The output upper limit value β indicates an upper limit value for the electric power that is discharged from (generated by) the battery 20. If it is assumed that the electric power discharged from (generated by) the battery 20 is of a positive value, and that the electric power supplied to charge the battery 20 is of a negative value, then the input upper limit value α is a negative value, and the output upper limit value β is a positive value. The battery protection control process is a control process for protecting the battery 20 by limiting the output of the battery 20, which corresponds to the electric power priority control process disclosed in US 2014/0191689A1.

Figure 3:
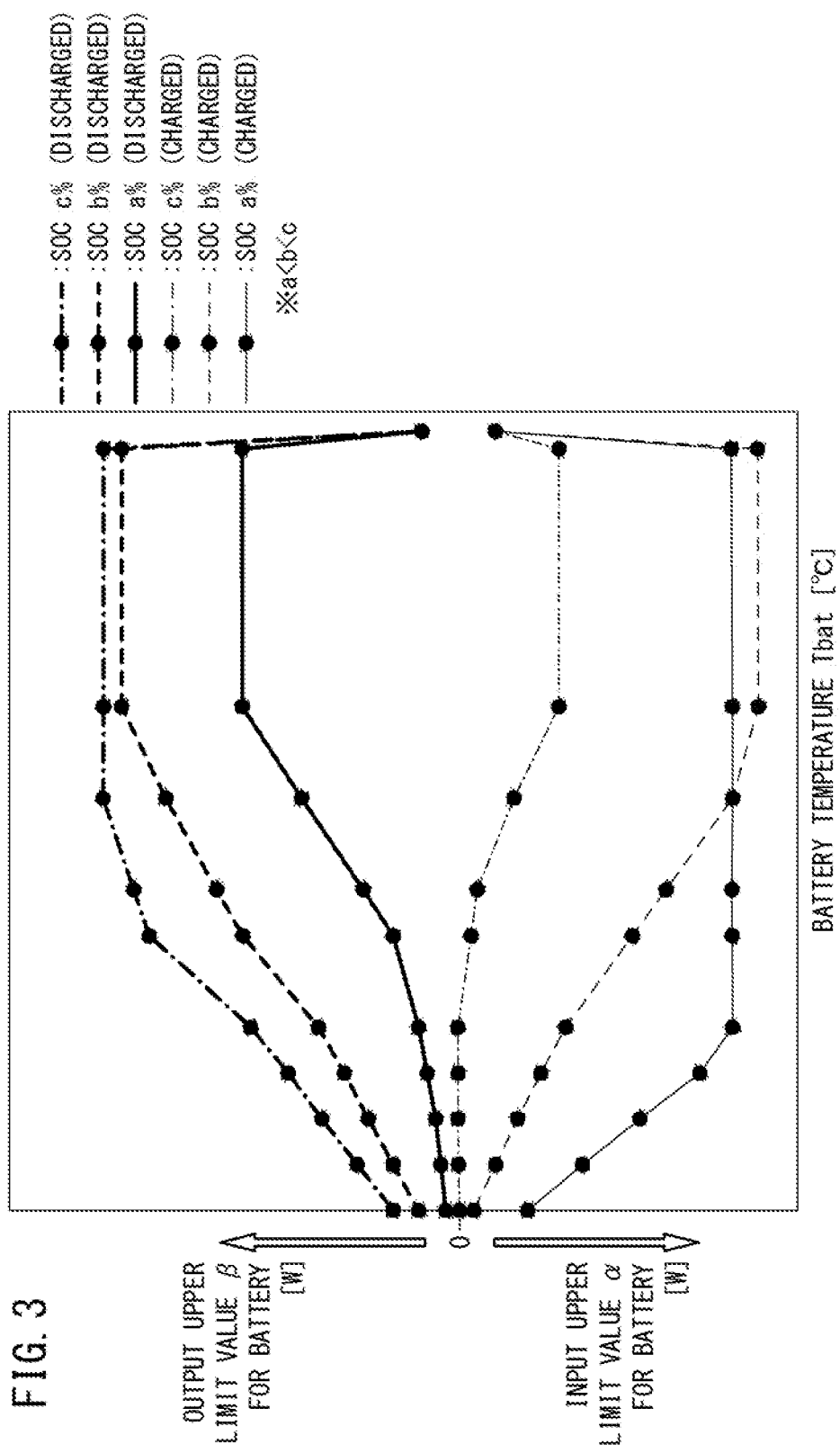
FIG. 3 is a diagram showing an example of a relationship between a combination of temperatures and charged states (SOCs) of a battery, and input upper limit values and output upper limit values of the battery.

FIG. 3 is a diagram showing an example of the relationship between a combination of temperatures Tbat and SOCs of the battery 20, and input upper limit values α and output upper limit values β of the battery 20. In FIG. 3, the electric power (upper limit value α) that is supplied in order to charge the battery 20 is of a negative value, whereas the electric power (upper limit value β) that is discharged from (generated by) the battery 20 is of a positive value.

As can be seen from FIG. 3, with certain exceptions, the upper limit value α (absolute value) has a tendency such that the higher the battery temperature Tbat is or the lower the SOC is, the greater the upper limit value α is. Furthermore, the upper limit value β (absolute value) has a tendency such that the higher the battery temperature Tbat is or the higher the SOC is, the greater the upper limit value β is. According to the present embodiment, the ECU 28 sets initial values α1, β1 for the upper limit values α, β on the basis of the battery temperature Tbat that is acquired from the temperature sensor 50, and the battery SOC that is acquired from the SOC sensor 52. More specifically, the ECU 28 stores in the memory 44 a map (initial value map), not shown, in which combinations of battery temperatures Tbat and SOCs, and the initial values α1, β1 are related to each other, and sets the initial values α1, β1 using the initial value map.

In step S2, the ECU 23 sets a target left and right torque difference ΔTT (hereinafter also referred to as a "target torque difference ΔTT" or a "torque difference ΔTT") (left and right torque difference control process). The torque difference ΔTT refers to the difference between the target torque TT1 for the left rear wheel 36a, and the target torque TT2 for the right rear wheel 36b, and is defined by the following equation (1).

$$\Delta TT = TT1 - TT2 \tag{1}$$

The torque difference ΔTT is calculated according to the following equation (2).

$$\Delta TT = 2r \cdot YMT/Tr \tag{2}$$

In equation (2), r indicates the radius of the rear wheels 36a, 36b, YMT indicates a target yaw moment, and Tr indicates the wheel tread-width (the distance between the left and right rear wheels 36a, 36b). The target yaw moment YMT is set on the basis of the steering angle θst from the steering angle sensor 58 and the vehicle speed V from the vehicle speed sensor 54. The radius r and the wheel tread-width Tr are of fixed values, whereas the target yaw moment YMT is a variable value.

The ECU 28 stores in the memory 44 a map (target torque difference map), not shown, in which parameters for setting the target yaw moments YMT or the target yaw moments YMT themselves, and target torque differences ΔTT are related to each other. The ECU 28 sets the target torque difference ΔTT using such a map.

In step S3, the ECU 28 sets a target left and right torque sum TRT (hereinafter also referred to as a "target-torque sum TRT" or a "torque sum TRT") (left and right torque sum control process). The torque sum TRT refers to a sum of the target torque TT1 for the left rear wheel 36a and the target torque TT2 for the right rear wheel 36b, and is defined by the following equation (3).

$$TRT = TT1 + TT2 = \tag{3}$$

Setting of the torque sum TRT will be described later with reference to FIG. 4.

In step S4, the ECU 23 calculates target wheel torques TT1, TT2 on the basis of the target torque difference ΔTT (step S2) and the target torque sum TRT (step S3). More specifically, since the following equations (4) and (5) can be derived from the above equations (1) and (3), the ECU 28 can calculate target wheel torques TT1, TT2 on the basis of the target torque difference ΔTT and the target torque sum TRT.

$$TT1 = (TRT + \Delta TT)/2 \tag{4}$$

$$TT2 = (TRT - \Delta TT)/2 \tag{5}$$

In step S5, the ECU 28 controls the rear motors 16, 18 through the inverters 24, 26 on the basis of the target wheel torques TT1, TT2 that were calculated in step S4. More specifically, the ECU 28 calculates target torques TM1, TM2 for the rear motors 16, 18 on the basis of the target wheel torques TT1, TT2 according to the following equations (6) and (7).

$$TM1 = (1/R1) \cdot TT1 \qquad (6)$$

$$TM2 = (1/R2) \cdot TT2 \qquad (7)$$

In equation (6), R1 refers to the speed reduction ratio of a speed reducer, not shown, which may be disposed between the motor 16 and the left rear wheel 36a (if no speed reducer is provided, R1 becomes 1). In equation (7), R2 refers to the speed reduction ratio of a speed reducer, not shown, which may be disposed between the motor 18 and the right rear wheel 36b (if no speed reducer is provided, R2 becomes 1).

B-2. Left and Right Torque Sum Control Process (1-1. Overview of Left and Right Torque Sum Control Process)

Figure 4:
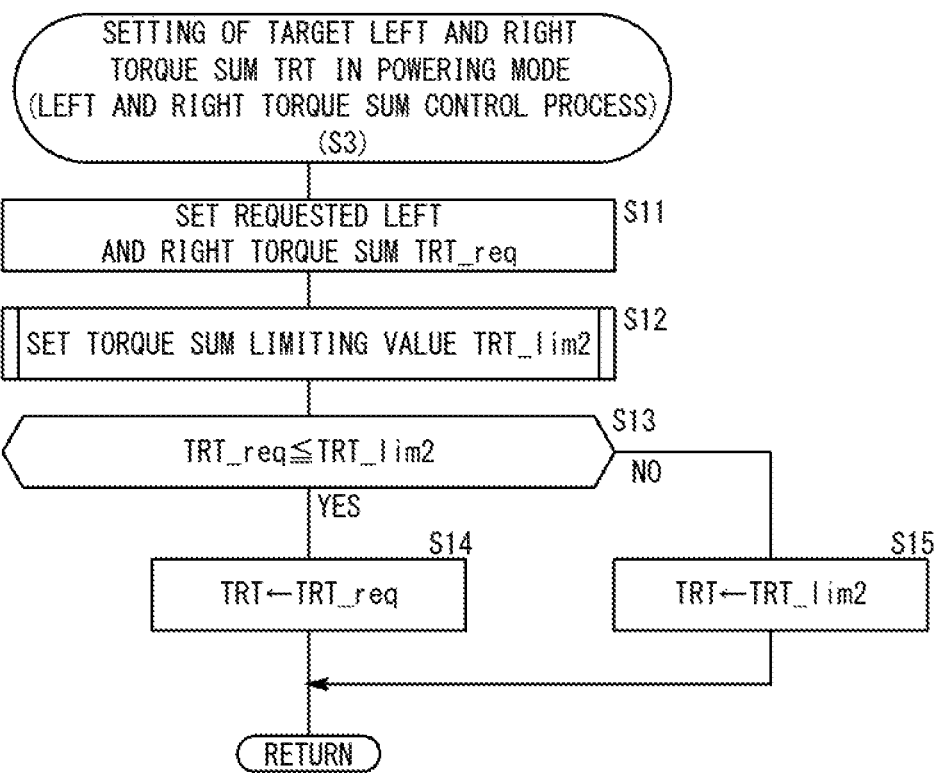
FIG. 4 is a flowchart (an example of details of step S3 of FIG. 2) of a left and right torque sum control process for setting a target left and right torque sum, during a time that the vehicle is in a powering mode.

FIG. 4 is a flowchart (an example of details of step S3 of FIG. 2) of the left and right torque sum control process for setting a target left and right torque sum TRT when the vehicle 10 is in a powering mode. When the vehicle 10 is in a regenerative mode, using the input upper limit value α, it is possible to perform the same process as the illustrated left and right torque sum control process.

In step S11, the ECU 28 sets a requested left and right torque sum TRT_req (hereinafter also referred to as a "requested torque sum TRT_req"). The requested torque sum TRT_req refers to a requested value from the driver with respect to the sum of the wheel torques T1, T2 (left and right torque sum). The requested torque sum TRT_req is set on the basis of the accelerator opening θap from the accelerator pedal opening sensor 56, and the motor rotational speed Nmot from the rotational speed sensor 60, for example. The motor rotational speed Nmot as used herein may be an average value or a maximum value of the rotational speeds NmotL, NmotR of the second and third motors 16, 18, for example.

Alternatively, in a control process for automatically adjusting the vehicle speed V of the vehicle 10 (cruise control process), the ECU 28 may control the requested torque sum TRT_req on the basis of a target opening for a throttle valve, not shown, which is set in the vehicle 10, and the rotational speeds NmotL, NmotR. The vehicle speed V may be used instead of the motor rotational speed Nmot.

The ECU 28 stores in the memory 44 a map (requested torque sum map), not shown, in which combinations of accelerator openings θap and motor rotational speeds Nmot, and requested torque sums TRT_req are related to each other, and sets the requested torque sum TRT_req using the requested torque sum map.

In step S12, the ECU 28 sets a torque sum limiting value TRT_lim2 (hereinafter also referred to as a "limiting value TRT_lim2"). The limiting value TRT_lim2 refers to a limiting value (upper limit value) for the requested torque sum TRT_req, which is set in view of the initial value β1 of the output upper limit value β, and the left and right torque difference ΔTT, etc. Details in relation to setting the torque sum limiting value TRT_lim2 will be described later with reference to FIG. 5.

In step S13, the ECU 23 ascertains whether or not the requested torque sum TRT_req is equal to or less than the limiting value TRT_lim2. If the requested torque sum TRT_req is equal to or less than the limiting value TRT_lim2 (step S13: YES), then in step S14, the ECU 28 uses the requested torque sum TRT_req directly as the target torque sum TRT (TRT←TRT_req). If the requested torque sum TRT_req is not equal to or less than the limiting value TRT_lim2 (step S13: NO), then in step S15, the ECU 28 uses the torque sum limiting value TRT_lim2 as the target torque sum TRT (TRT←TRT_lim2).

(1-2. Setting of Torque Sum Limiting Value TRT_lim2)

Figure 5:
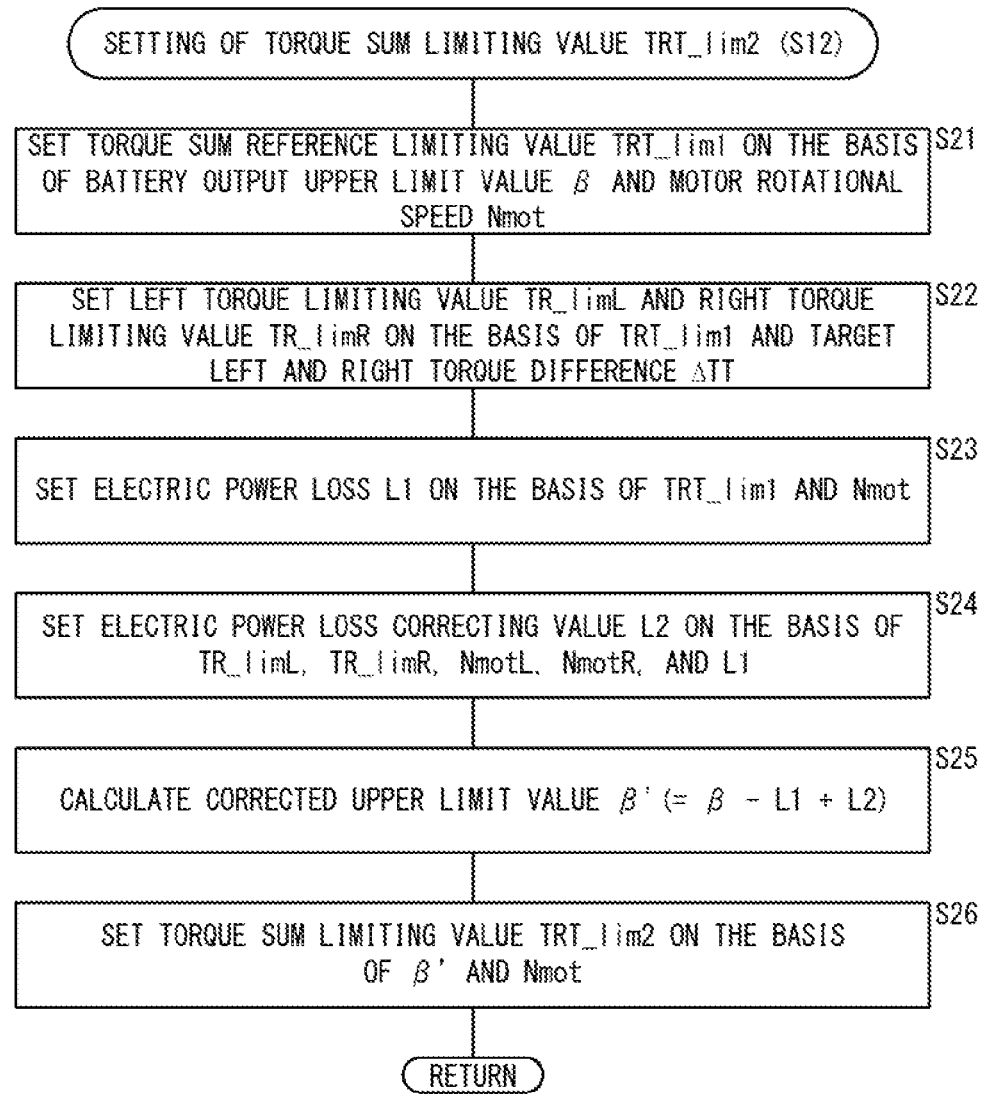
FIG. 5 is a flowchart (details of step S12 of FIG. 4) of a process for setting a torque sum limiting value.
Figure 6:
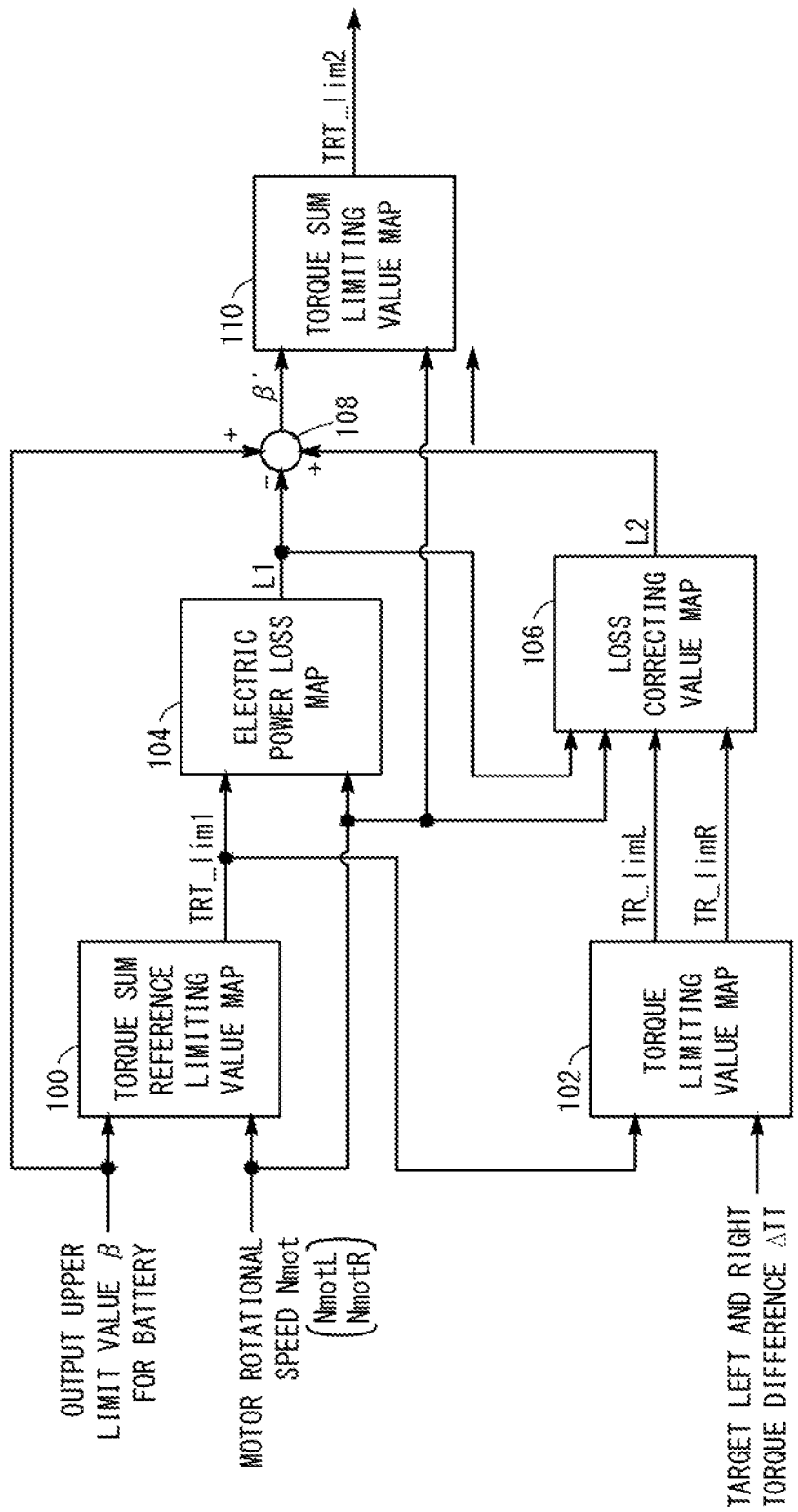
FIG. 6 is a first diagram (block diagram) illustrating setting of a torque sum limiting value.
Figure 7:
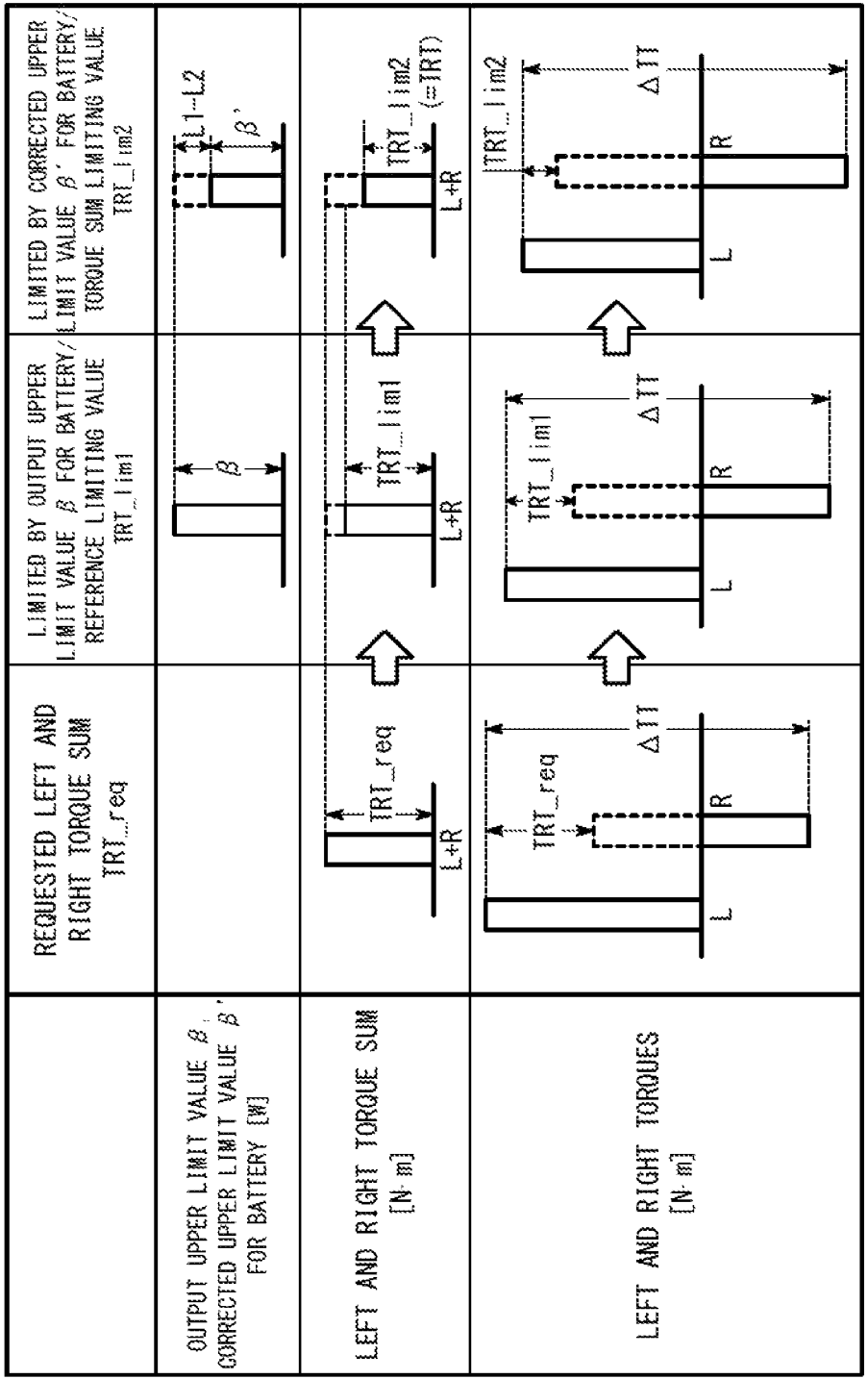
FIG. 7 is a second diagram illustrating setting of a torque sum limiting value.

FIG. 5 is a flowchart (details of step S12 of FIG. 4) of a process for setting a torque sum limiting value TRT_lim2. FIG. 6 is a first diagram (block diagram) illustrating setting of the torque sum limiting value TRT_lim2. FIG. 7 is a second diagram illustrating setting of the torque sum limiting value TRT_lim2. FIG. 7 shows an example in which the vehicle 10 makes a right turn (clockwise).

In step S21 of FIG. 5, the ECU 28 calculates a torque sum reference limiting value TRT_lim1 (hereinafter referred to as a "reference limiting value TRT_lim1" or a "limiting value TRT_lim1") on the basis of the output upper limit value β for the battery 20 and the motor rotational speed Nmot. The limiting value TRT_lim1 refers to a limiting value for the requested torque sum TRT_req, which is set with respect to the output upper limit value β and the motor rotational speed Nmot.

The output upper limit value β in this case implies the initial value β1. However, as described later, the output upper limit value β may also refer to a corrected output upper limit value β if the output upper limit value β is corrected a plurality of times. The motor rotational speed Nmot in this case may be an average value or a maximum value of the rotational speeds NmotL, NmotR of the second and third motors 16, 18, for example.

According to the present embodiment, the limiting value TRT_lim1 is set in view of an electric power loss that occurs when the battery 20 supplies electric power to the motors 16, 18 (e.g., a loss due to electric power conversion in the inverters 24, 26, and a loss due to heating of the motors 16, 18).

As indicated in the center of FIG. 7 (second row, second column), if the requested torque sum TRT_req is greater than the reference limiting value TRT_lim1, then the target torque sum TRT is limited to a value that is equal to or less than the reference limiting value TRT_lim1. In this case, in order to maintain the target left and right torque difference ΔTT during a right turn, a torque T1 (absolute value) in a positive direction (powering mode direction) of the left rear wheel 36a is reduced, and a torque T2 (absolute value) in a negative direction (regenerative mode direction) of the right rear-wheel 36b is increased (see the lower side in the center of FIG. 7 (third row, second column).

The ECU 28 stores in the memory 44 a map 100 (torque sum reference limiting value map 100) (FIG. 6) in which combinations of output upper limit values β and motor rotational speeds Nmot, and torque sum reference limiting values TRT_lim1 are related to each other, and sets the limiting value TRT_lim1 using such a map 100.

In step S22 of FIG. 5, the ECU 28 sets a left torque limiting value TR_limL and a right torque limiting value TR_limR on the basis of the limiting value TRT_lim1 (step S21) and the target left and right torque difference ΔTT (step S2 in FIG. 2). The left torque limiting value TR_limL refers to a limiting value (upper limit value) for the target torque TT1 of the left motor 16, which is determined with respect to the limiting value TRT_lim1 and the target left and right torque difference ΔTT. The right torque limiting value TR_limR refers to a limiting value (upper-limit value) for the target torque TT2 of the right motor 18, which is determined with respect to the limiting value TRT_lim1 and the target left and right torque difference The ECU 28 stores in the memory 44 a map 102 (torque limiting value map 102) (FIG. 6) in which combinations of limiting values TRT_lim1 and target left and right torque differences ΔTT, and limiting values TR_limL, TR_limR are related to each other, and sets the limiting values TR_limL, TR_limR using such a map 102.

In step S23, the ECU 28 sets an electric power loss L1 on the basis of the reference limiting value TRT_lim1 and the motor rotational speed Nmot. The electric power loss L1 refers to a sum of electric power losses L1L, L1R (L1=L1L+L1R) that occur respectively in the motors 16, 18 depending on the motor rotational speed Nmot. As used herein, the motor rotational speed Nmot may foe an average value or a maximum value of the rotational speeds NmotL, NmotR of the second and third motors 16, 18, for example. When an average value of the rotational speeds NmotL, NmotR is used as the motor rotational speed Nmot, this implies that the sum of the torques of the motors 16, 18 is equal to the limiting value TRT_lim1 (the torque of each of the motors 16, 18 is the same as one half of the limiting value TRT_lim1), while the outputs of the motors 16, 18 are equal to each other, i.e., L1L=L1R.

The ECU 28 stores in the memory 44 a map 104 (electric power loss map 104) (FIG. 6) in which combinations of reference limiting values TRT_lim1 and motor rotational speeds Nmot, and electric power losses L1 are related to each other, and sets the electric power loss L1 using such a map 104.

In step S24, the ECU 28 sets an electric power loss correcting value L2 (hereinafter also referred to as a "loss correcting value L2" or a "correcting value L2") on the basis of the left torque limiting value TR_limL, the right torque limiting value TR_limR, the motor rotational speeds NmotL, NmotR, and the electric power loss L1. The correcting value L2 refers to a sum of an electric power loss correcting value L2L for the left motor 16 and an electric power loss correcting value L2R for the right motor 18 (L2=L2L+L2R).

The electric power loss correcting value L2L indicates the difference between an electric power loss L1 that occurs in the left motor 16 depending on the motor rotational speed NmotL and the electric power loss L1L (L1L−L1=(L1/2)−L1) when the torque T1 of the left rear wheel 36a is equal to the limiting value TR_limL. Similarly, the electric power loss correcting value L2R indicates the difference between an electric power loss Lr that occurs in the right motor 18 depending on the motor rotational speed NmotR and the electric power loss L1R (L1R−Lr=(L1/2)−Lr) when the torque T2 of the right rear wheel 36b is equal to the limiting value TR_limR.

Figure 8:
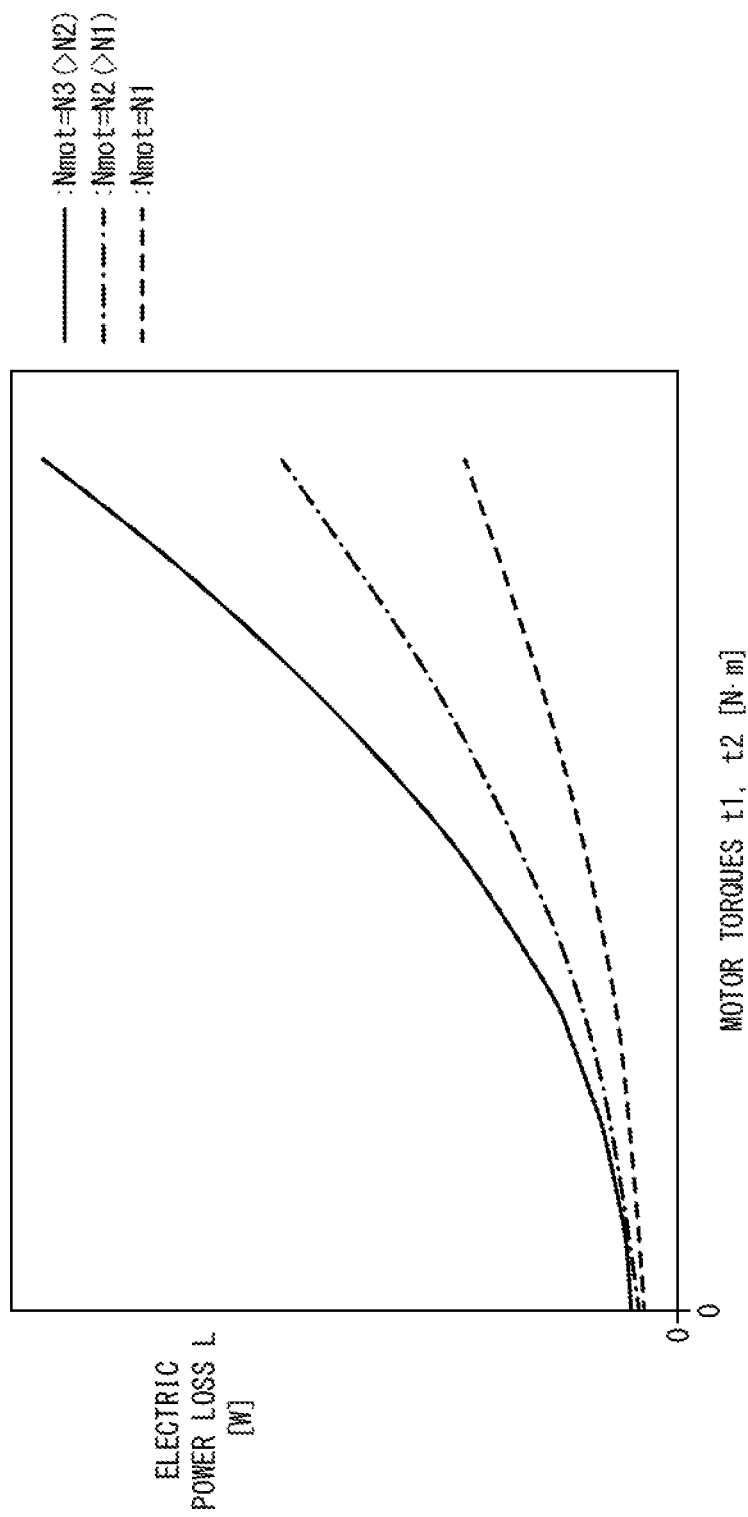
FIG. 8 is a diagram showing an example of a relationship between a combination of torques and motor rotational speeds of respective left and right motors, and electric power losses (actual values)

FIG. 8 illustrates conceptually the electric power loss correcting value L2. More specifically, FIG. 8 shows an example of a relationship between a combination of torques t1, t2 (hereinafter also referred to as "motor torques t1, t2") and motor rotational speeds Nmot (NmotL, NmotR) of the respective left and right motors 16, 18 and the electric power losses L (actual values). As seen from FIG. 8, the greater the motor torques t1, t2 or the motor rotational speeds Nmot are, the greater the electric power losses L of the motors 16, 18 are.

As described above, for the electric power loss L1, for example, a case is assumed in which the torques t1, t2 of the left and right motors 16, 18 are equal to each other. In order to realize the target left and right torque difference ΔTT, a situation occurs in which the torques t1, t2 of the left and right motors 16, 18 are different from each other, and the motor rotational speeds NmotL, NmotR are different from each other. Therefore, if only the electric power loss L1 is used in realizing the target left and right torque difference ΔTT, there is a concern that errors will increase.

According to the present embodiment, the electric power loss correcting value L2 is used, so as to enable a reduction in error of the electric power loss L that is reflected in the output upper limit value β for the battery 20. As a result, it is possible to appropriately set the target left and right torque sum TRT.

The ECU 28 stores in the memory 44 a map 106 (loss correcting value map 106) (FIG. 6) in which combinations of left torque limiting values TR_limL and motor rotational speeds NmotL and electric power losses L1 are related to each other, and combinations of right torque limiting values TR_limR and motor rotational speeds NmotR and electric power losses Lr are related to each other. The ECU 28 sets a loss correcting value L2 using the electric power loss L1, which is set according to the map 104, and the electric power losses L1, Lr, which are set according to the map 106.

Alternatively, the ECU 28 may store in the memory 44 a map (left loss correcting value map), not shown, in which combinations of left torque limiting values TR_limL and motor rotational speeds NmotL and correcting values L2L are related to each other, and a map (right loss correcting value map), not shown, in which combinations of right torque limiting values TR_limR and motor rotational speeds NmotR and correcting values L2R are related to each other. In this case, it is possible to calculate correcting values L2L, L2R using such maps, and to calculate a correcting value L2 by adding the correcting values L2L, L2R.

In step S25 of FIG. 5, an adder 108 (FIG. 6) of the ECU 28 subtracts the electric power loss L1 from the output upper limit value β (e.g., the initial value β1) for the battery 20, and then adds the correcting value L2, thereby calculating a new output upper limit value β (e.g., an output upper limit value β2 based on the initial value β1). The new output upper limit value β will hereinafter also be referred to as a corrected upper limit value β' (β'=β−L1+L2).

In step S26, the ECU 28 sets a torque sum limiting value TRT_lim2 on the basis of the corrected upper limit value β' and the motor rotational speed Nmot. The limiting value TRT_lim2 takes into account a change in the electric power loss L depending on the combination of the left torque limiting value TR_limL and the motor rotational speed NmotL, and a change in the electric power loss L depending on the combination of the right torque limiting value TR_limR and the motor rotational speed NmotR, in comparison with the torque sum reference limiting value TRT_lim1. The motor rotational speed Nmot in this case may be an average value or a maximum value of the rotational speeds NmotL, NmotR of the second and third motors 16, 18, for example.

The ECU 28 stores in the memory 44 a map 110 (torque sum limiting value map 110) (FIG. 6) in which the corrected upper limit values β', the motor rotational speeds Nmot, and the limiting values TRT_lim2 are related to each other, and sets the limiting value TRT_lim2 using such a map 110.

As indicated on a right side in the center of FIG. 7 (second row, third column), if the reference limiting value TRT_lim1 is greater than the limiting value TRT_lim2, the target torque sum TRT is set to the limiting value TRT_lim2, In this case, in order to maintain the target torque difference ΔTT, a target torque TT1 in the positive direction (powering mode direction) of the left rear wheel 36a is reduced, and a target torque TT2 (absolute value) in the negative direction (regenerative mode direction) of the right rear wheel 36b is increased (see the lower right side of FIG. 7 (third row, third column). Conversely, if the reference limiting value TRT_lim1 is less than the limiting value TRT_lim2, the target torque sum TRT is increased up to the limiting value TRT_lim2. In this case, in order to maintain the target torque difference ΔTT, the target torque TT1 in the positive direction (powering mode direction) of the left rear wheel 36*a* is increased, and the target torque TT2 (absolute value) in the negative direction (regenerative mode direction) of the right rear wheel 36*b* is reduced.

C. Advantages of the Present Embodiment

According to the present embodiment, as described above, the loss correcting value L2 (electric power loss), which is based on the rotational speeds NmotL, NmotR (rotational state quantities) of the motors 16, 18, is reflected in each of the target torques TT1, TT2 (motive power target values) for the left motor 16 (left electric motor) and the right motor 18 (right electric motor). Therefore, it is possible to appropriately set the target torques TT1, TT2 for the motors 16, 18.

According to the present embodiment, the ECU 28 (electric motor controller) sets a torque sum limiting value TRT_lim2 (upper limit value for the sum motive power) on the basis of the output upper limit value β (electric power that is capable of being supplied), the electric power loss L1 and the correcting value L2 depending on the motor rotational speeds NmotL, NmotR (rotational state quantities), and the target left and right torque difference ΔTT (target motive power difference) (step S12 of FIG. 4, FIG. 5). Further, the ECU 28 sets a target motor torque TM1 (target left motive power) and a target motor torque TM2 (target right motive power) to ranges in which the requested left and right torque sum TRT_req (requested motive power sum) does not exceed the limiting value TRT_lim2, while maintaining the target torque difference ΔTT (steps S13 through S15 of FIG. 4, steps S4 and S5 of FIG. 2).

By thus setting the limiting value TRT_lim2 on the basis of the motor rotational speeds NmotL, NmotR (rotational state quantities) and the target torque difference ΔTT, in addition to the output upper limit value β (electric power that is capable of being supplied from the battery 20 as an electric power source), it is possible to appropriately control the torques t1, t2 (motive power) of the left and right motors 16, 18.

According to the present embodiment, the ECU 28 (electric motor controller) sets a torque sum reference limiting value TRT_lim1 (reference upper limit value for the sum motive power) on the basis of the output upper limit value β (electric power that is capable of being supplied) and the motor rotational speed Nmot (rotational state quantity) (step S21 of FIG. 5, FIG. 6). The ECU 28 also calculates an electric power loss L1 depending on the motor rotational speed Nmot on the basis of the reference limiting value TRT_lim1 and the motor rotational speed Nmot (step S23, FIG. 6). Furthermore, the ECU 28 sets a left torque limiting value TR_limL (left motive power limiting value) and a right torque limiting value TR_limR (right motive power limiting value) on the basis of the reference limiting value TRT_lim1 and the target left and right torque difference ΔTT (step S22, FIG. 6). Moreover, the ECU 28 calculates a correcting value L2 on the basis of the limiting values TR_limL, TR_limR and the motor rotational speeds NmotL, NmotR (step S24, FIG. 6). The ECU 28 sets a torque sum limiting value TRT_lim2 (upper limit value for the sum motive power) on the basis of the output upper limit value β, the electric power loss L1, and the correcting value L2 (step S26, FIG. 6).

As described above, the ECU 28 calculates the correcting value L2 for the electric power loss L1 on the basis of the left and right torque limiting values TR_limL, TR_limR and the motor rotational speeds NmotL, NmotR. In addition, the ECU 28 sets the torque sum limiting value TRT_lim2 on the basis of the output upper limit value β, the electric power loss L1, and the correcting value L2. The limiting values TR_limL, TR_limR are based on the reference limiting value TRT_lim1 and the target torque difference ΔTT, and the reference limiting value TRT_lim1 is based on the output upper limit value β and the motor rotational speed Nmot (FIG. 6). Consequently, it is possible to reflect the electric power loss depending on the left and right limiting values TR_limL, TR_limR, in addition to the electric power loss depending on the motor rotational speed Nmot. Therefore, it is possible to control the torques t1, t2 (motive power) of the motors 16, 18 more efficiently.

II. Modifications

The present invention is not limited to the above embodiment, but various arrangements may be adopted therein based on the content of the present description. For example, the present invention may adopt the following arrangements.

A. Vehicle 10 (Object to which the Present Invention is Applicable)

The above embodiment has been described as being applied to the vehicle 10 as a four-wheeled motor vehicle (FIG. 1). However, the present invention may also be applied to vehicles having left and right drive wheels other than four-wheel motor vehicles, from the viewpoint of reflecting an electric power loss based on the rotational speeds NmotL, NmotR of the left and right motors 16, 18 (or the rotational speeds [rpm] per unit time of the left and right rear wheels 36*a*, 36*b*). For example, the vehicle 10 may be either a three-wheeled motor vehicle or a six-wheeled motor vehicle.

In the above embodiment, the vehicle 10 has one engine 12 and three traction motors 14, 16, 18 that serve as drive sources. However, the drive sources are not limited, to such a combination. For example, the vehicle 10 may have one or a plurality of traction motors for the front wheels 32, and one or a plurality of traction motors for the rear wheels 36, which serve as drive sources. An arrangement can also be adopted in which individual traction motors (including so-called in-wheel motors) are assigned respectively to all of the wheels.

Figure 9:
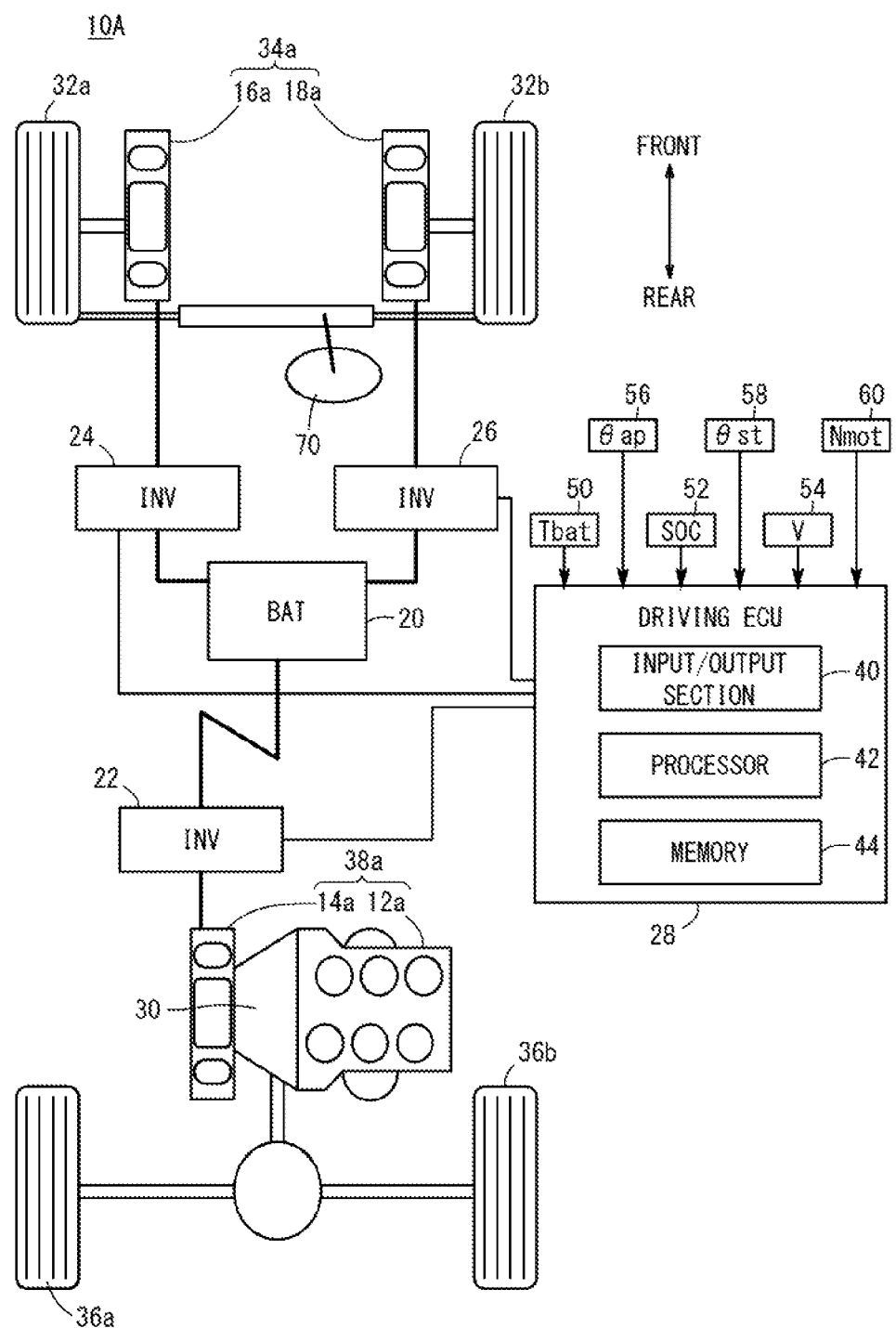
FIG. 9 is a schematic view of the drive train and the surrounding periphery of a vehicle according to a modification of the present invention.

FIG. 9 is a schematic view of the drive train and the surrounding periphery of a vehicle 10A according to a modification of the present invention. On the vehicle 10A, the structural arrangements of the front wheel driving device 34 and the rear wheel driving device 38 of the vehicle 10 according to the above embodiment are switched. More specifically, the vehicle 10A includes a front wheel driving device 34*a* having second and third traction motors 16*a*, 18*a* that are disposed on a front side of the vehicle 10A. The vehicle 10A also includes a rear wheel driving device 38*a* having an engine 12*a* and a first traction motor 14*a* that are disposed in line on a rear side of the vehicle 10A.

B. First Through Third Traction Motors 14, 16, 18

In the above embodiment, the first through third traction motors 14, 16, 18 comprise three-phase AC brushless motors. However, the first through third traction motors 14, 16, 18 are not limited to three-phase AC brushless motors, but may be three-phase AC brush motors, single-phase AC motors, or DC motors, for example.

C. Battery 20 (Electric Power Source)

In the above embodiment, the battery 20 and the first motor 14 (when the first motor 14 generates electricity with drive power from the engine 12) are used as electric power sources for the second and third traction motors 16, 18.

However, from the viewpoint of reflecting the electric power loss based on the rotational speeds NmotL, NmotR of the motors 16, 18 in the control of the motors 16, 18, for example, the present invention is not limited to such an electric power source combination. For example, it is possible to employ an arrangement in which the first motor 14 does not generate electricity. Further, another electric power source such as a fuel cell or the like may be used in addition to or instead of the battery 20.

D. Control by Driving ECU 28

D-1. Switching Between Drive Modes

In the above embodiment, the ECU 28 is capable of switching between FWD, RWD, and AWD as drive modes for the vehicle 10. However, from the viewpoint of reflecting the electric power loss based on the rotational speeds NmotL, NmotR of the motors 16, 18 in the control of the motors 16, 18, for example, the present invention is not limited to such a drive mode combination, insofar as a drive mode for driving the vehicle with left and right drive wheels (the left and right rear wheels 36a, 36b in the above embodiment) is included. For example, the present invention can be applied to an arrangement in which only the RWD drive mode is possible.

D-2. Control Parameters of Left and Right Rear Wheels 36a, 36b (Left and Right Drive Wheels)

In the above embodiment, the target torques TT1, TT2 are used as control parameters for controlling the torques T1, T2 of the left and right rear wheels 36a, 36b. However, from the viewpoint of controlling the torques T1, T2 of the left and right rear wheels 36a, 36b, the present invention is not limited to such control parameters. For example, in the above embodiment, although the target motor torques TM1, TM2 are calculated after the target wheel torques TT1, TT2 have been calculated, it is possible to calculate the target motor torques TM1, TM2 without first calculating the target wheel torques TT1, TT2. Alternatively, instead of the target torques TT1, TT2 [N·m], it is possible to use a braking/driving power [N] including at least one of a driving power and a braking power. Further, alternatively, it is possible to use a target value [W] for the outputs of the motors 16, 18, or a target value [A] for the output currents supplied to the motors 16, 18.

In the above embodiment, the motor rotational speeds Nmot (NmotL, NmotR) are used as rotational state quantities of the motors 16, 18, which are used in setting the torque sum limiting value TRT_lim2. However, from the viewpoint of reflecting the electric power loss based on the rotational state quantities of the motors 16, 18 in the control of the motors 16, 18, for example, it also is possible to use other parameters (e.g., the rotational speeds of the rear wheels 36a, 36b) rather than the motor rotational speeds Nmot.

D-3. Input Upper Limit Value α, Output Upper Limit Value β, and Torque Sum Limiting Value TRT_lim2

In the above embodiment, a situation has been described in which the sum of the torques T1, T2 of the left and right rear wheels 36a, 36b is of a positive value in relation to the output upper limit value β. However, from the viewpoint of reflecting the electric power loss (FIG. 8) based on the rotational speeds NmotL, NmotR of the left and right motors 16, 18, a control process can also be performed that is related to the input upper limit value α, in a situation in which the sum of the torques T1, T2 of the left and right rear wheels 36a, 36b is of a negative value. In this case, it is possible to set the initial value α1 for the input upper limit value α from a combination of the battery temperature Tbat and the SOC, and thereafter calculate target wheel torques TT1, TT2 and target motor torques TM1, TM2 using a corrected upper limit value α', which reflects the electric power loss that occurs when the motors 16, 18 are in the regenerative mode.

In the above embodiment, both the input upper limit value α and the output upper limit value β of the battery 20 are used (step S1 of FIG. 2). However, either one of the input upper limit value α or the output upper limit value β may be used, from the viewpoint of reflecting the electric power loss (FIG. 8) based on the rotational speeds NmotL, NmotR of the motors 16, 18.

In the above embodiment, the initial value β1 of the output upper limit value β is set on the basis of the temperature Tbat and the SOC of the battery 20 (step S1 of FIG. 2). However, from the viewpoint of setting the initial value β1, for example, only one of the temperature Tbat and the SOC can be used.

In the above embodiment, the output upper limit value β is corrected only once (FIG. 5). However, from the viewpoint of reflecting the electric power loss based on the rotational speeds NmotL, NmotR of the left and right motors 16, 18, the output upper limit value β can be corrected a plurality of times. In this case, a process of calculating the electric power loss L1 and the loss correcting value L2 again, using the corrected upper limit value β' as a new output upper limit value β, and then calculating a new corrected upper limit value β', is performed at least once.

In the above embodiment, a situation has been described in which the electric power loss L1 and the loss correcting value L2 are reflected in the output upper limit value β (see FIGS. 5 through 7). However, the present invention is not limited to such a situation, from the viewpoint of realizing the target torque difference ΔTT while preventing the battery 20 from producing an excessive output.

More specifically, an upper limit value (torque sum limiting value TRT_lim2) for the sum motive power of the left and right motors 16, 18 may be set on the basis of the electric power that is capable of being supplied from the electric power source (the output upper limit value β of the battery 20, etc.), the rotational state quantities (the rotational speeds NmotL, NmotR) of the respective motors 16, 18, and the target motive power difference (the target torque difference ΔTT, etc.) between the left and right motors 16, 18. Then, the target torque sum TRT (absolute value) may be kept smaller than the torque sum limiting value TRT_lim2 (absolute value), thus making it possible to realize the target torque difference ΔTT while preventing the battery 20 from producing an excessive output.

For example, the ECU 28 may store in the memory 44 a map (torque sum limiting value map), not shown, in which battery temperatures Tbat, battery SOCs, motor rotational speeds Nmot (NmotL, NmotR), target torque differences ΔTT, and torque sum limiting values TRT_lim2 are related to each other, and may set a torque sum limiting value TRT_lim2 using such a map.

Alternatively, the ECU 28 may store in the memory 44 a map (torque sum limiting value map), not shown, in which initial values β1 for the output upper limit value β for the battery 20, motor rotational speeds Nmot (NmotL, NmotR), target torque differences ΔTT, and torque sum limiting values TRT_lim2 are related to each other, and may set a torque sum limiting value TRT_lim2 using such a map. In this case, the above-described initial value map is used for setting the initial values β1.

In the above embodiment, a situation has been described in which, after the torque sum limiting value TRT_lim2 has been calculated, a target torque sum TRT is calculated (FIG. 4). However, the present invention is not limited to such a situation, from the viewpoint of realizing the target torque difference ΔTT while preventing the battery 20 from producing an excessive output.

For example, the ECU 28 may store in the memory 44 a map (target torque map), not shown, in which the amounts of electric power that can foe supplied from the electric power source (output upper limit values β of the battery 20, etc.) or parameters (temperatures Tbat, SOCs of the battery 20, etc.) for setting the amounts of electric power, rotational state quantities (the rotational speeds NmotL, NmotR) of the respective left and right motors 16, 18, target motive power differences (target torque differences ΔTT, etc.) between the left and right motors 16, 18, target motive power sums (requested torque sums TRT_req., etc.) of the left and right motors 16, 18, and target wheel torques TT1, TT2 or target motor torques TM1, TM2 are related to each other, and may set the target wheel torques TT1, TT2 or the target motor torques TM1, TM2 using such a map.

The invention claimed is:

1. A vehicle comprising:
    a left electric motor mechanically connected to a left wheel;
    a right electric motor mechanically connected to a right wheel;
    an electric motor controller, which is configured to control a left motive power that is a motive power generated by the left electric motor, and control a right motive power that is a motive power generated by the right electric motor; and
    an electric power source electrically connected to the left electric motor and the right electric motor;
    wherein the electric motor controller is configured to:
    determine a left and right sum upper limit value, which is a maximum value of a sum of the left motive power and the right motive power, based on the electric power that is capable of being supplied from the electric power source;
    determine a target left motive power for the left electric motor and a target fight motive power for the right electric motor, based on the left and right sum upper limit value, a target left and right difference, which is a target value for a difference between the left motive power and the right motive power, and a target left and right sum, which is a target value for a sum of the left motive power and the right motive power;
    determine a left loss electric power based on the target left motive power and a rotational state quantity of the left electric motor, and a right loss electric power based on the target right motive power and a rotational state quantity of the right electric motor;
    correct the left and right sum upper limit value based on the left loss electric power and the right loss electric power, to thereby determine a corrected left and right sum upper limit value;
    correct the target left motive power and the target right motive power based on the corrected left and right sum upper limit value and the target left and right difference; and
    control the left electric motor and the right electric motor based on the target left motive power and the target right motive power, which have been corrected.

2. A method of controlling a vehicle, wherein:
    the vehicle includes:
    a left electric motor mechanically connected to a left wheel;
    a right electric motor mechanically connected to a right wheel;
    an electric motor controller, which is configured to control a left motive power that is a motive power generated by the left electric motor, and control a right motive power that is a motive power generated by the right electric motor; and
    an electric power source electrically connected to the left electric motor and the right electric motor;
    wherein the electric motor controller is configured to perform the steps of:
    determining a left and right sum upper limit value, which is a maximum value of a sum of the left motive power and the right motive power, based on the electric power that is capable of being supplied from the electric power source;
    determining a target left motive power for the left electric motor and a target right motive power for the right electric motor based on the left and right sum upper limit value, a target left and right difference, which is a target value for a difference between the left motive power and the right motive power, and a target left and right sum, which is a target value for a sum of the left motive power and the right motive power;
    determining a left loss electric power based on the target left motive power and a rotational state quantity of the left electric motor, and a right loss electric power based on the target right motive power and a rotational state quantity of the right electric motor;
    correcting the left and right sum upper limit value based on the left loss electric power and the right loss electric power, to thereby determine a corrected left and right sum upper limit value;
    correcting the target left motive power and the target right motive power based on the corrected left and right sum upper limit value and the target left and right difference; and
    controlling the left electric motor and the right electric motor, based on the target left motive power and the target right motive power, which have been corrected.

3. A vehicle comprising:
    a left electric motor mechanically connected to a left wheel;
    a right electric motor mechanically connected to a right wheel;
    an electric motor controller, which is configured to control a left motive power that is a motive power generated by the left electric motor, and control a right motive power that is a motive power generated by the right electric motor; and
    an electric power source electrically connected to the left electric motor and the right electric motor;
    wherein the electric motor controller is configured to:
    set a target left motive power for the left electric motor and a target right motive power for the right electric motor, by limiting a target motive power difference between the left electric motor and the right electric motor, and a target motive power sum of the left electric motor and the right electric motor to a range of an electric power that is capable of being supplied from the electric power source, an electric power loss varied depending on respective rotational state quantities of the left electric motor and the right electric motor being reflected in the electric power; and
    control the left electric motor and the right electric motor using the target left motive power and the target right motive power.

4. The vehicle according to claim 3, wherein the electric motor controller is configured to:

set an upper limit value for a sum motive power of the left electric motor and the right electric motor, based on the electric power that is capable of being supplied, the electric power loss depending on the rotational state quantities, and the target motive power difference; and set the target left motive power and the target right motive power to ranges in which the target motive power sum does not exceed the upper limit for the sum motive power while the target motive power difference is maintained.

5. The vehicle according to claim 4, wherein the electric motor controller is configured to:

set a reference upper limit value for the sum motive power based on the electric power that is capable of being supplied and the rotational state quantities;

calculate an electric power loss depending on the rotational state quantities based on the reference upper limit value for the sum motive power and the rotational state quantities;

set a left motive power limiting value, which is a limiting value for the target left motive power, and a right motive power limiting value, which is a limiting value for the target right motive power, based on the reference upper limit value and the target motive power difference;

calculate a correcting value for the electric power loss based on the left motive power limiting value, the right motive power limiting value, and the rotational state quantities; and set the upper limit value for the sum motive power based on the electric power that is capable of being supplied, the electric power loss, and the correcting value.

* * * * *